(12) United States Patent
Wang

(10) Patent No.: US 12,041,353 B2
(45) Date of Patent: Jul. 16, 2024

(54) OPTIC ANTI-SHAKING MECHANISM, LENS DRIVING DEVICE, AND IMAGING EQUIPMENT

(71) Applicant: NEW SHICOH MOTOR CO., LTD., Jiaxing (CN)

(72) Inventor: Zaiwei Wang, Jiaxing (CN)

(73) Assignee: NEW SHICOH MOTOR CO., LTD., Jiaxing (CN)

( * ) Notice: Subject to any disclaimer, the term of this patent is extended or adjusted under 35 U.S.C. 154(b) by 143 days.

(21) Appl. No.: 17/722,375

(22) Filed: Apr. 17, 2022

(65) Prior Publication Data
US 2022/0353415 A1 Nov. 3, 2022

Related U.S. Application Data

(63) Continuation of application No. PCT/CN2022/078915, filed on Mar. 3, 2022.

(30) Foreign Application Priority Data

Apr. 28, 2021 (CN) .......................... 202110470323.7

(51) Int. Cl.
| | | |
|---|---|---|
| *H04N 23/68* | (2023.01) | |
| *H02K 41/035* | (2006.01) | |
| *H04N 23/51* | (2023.01) | |
| *H04N 23/54* | (2023.01) | |

(52) U.S. Cl.
CPC ....... *H04N 23/682* (2023.01); *H02K 41/0356* (2013.01); *H04N 23/51* (2023.01); *H04N 23/54* (2023.01)

(58) Field of Classification Search
CPC ...... H04N 23/682; H04N 23/51; H04N 23/54; H02K 41/0356
See application file for complete search history.

(56) References Cited

U.S. PATENT DOCUMENTS 9,785,038 B2 * 10/2017 Wu ...................... G02B 27/646

OTHER PUBLICATIONS

CN-206378669-U (An optical anti-shake VCM), published on Aug. 4, 2017 to Liu et al. (Year: 2017).*

* cited by examiner

*Primary Examiner* — Yogesh K Aggarwal
(74) *Attorney, Agent, or Firm* — Zhigang Ma

(57) ABSTRACT

Provided are an optical anti-shaking mechanism, a lens driving device, and an imaging equipment. The optical anti-shaking mechanism includes: a movable body configured to install a sensor, a fixed body configured to support the movable body, a resilient anti-shaking frame resiliently connected to the fixed body and the movable body and configured to make the movable body overhang the fixed body, and a driving assembly including: an X-axis driving assembly configured to drive the movable body to move along an X-axis in a horizontal plane perpendicular to an optical axis, and a Y-axis driving assembly configured to drive the movable body to move along a Y-axis in the horizontal plane perpendicular to the optical axis. The translation movement of the image sensor perpendicular to the optical axis is realized, and the object of optical anti-shake of the translation movement of the image sensor is achieved.

19 Claims, 8 Drawing Sheets

OPTIC ANTI-SHAKING MECHANISM, LENS DRIVING DEVICE, AND IMAGING EQUIPMENT

TECHNICAL FIELD

The disclosure relates to the technology field of optical component driving, and in particular to an optical anti-shaking mechanism, a lens driving device, and an imaging equipment.

BACKGROUND

When taking pictures with a camera, in order to improve quality of a high-pixel image, it is necessary to prevent hand shaking while focusing, so optical anti-shaking mechanisms are widely used in advanced cameras. An optical anti-shaking mechanism of a micro camera in a mobile phone has also become popular.

In addition, existing sensors, such as image sensors, generally detect and feedback images in a fixed manner, which cannot overcome a technical problem of poor detection effect when shaking.

In addition, an anti-shaking mechanism of the related art uses two L-shaped resilient sheets on diagonal positions to anti-shake optical components in a X direction and a Y direction. This anti-shaking compensation has poor anti-shaking performance. At the same time, a production process is complex and a cost is high.

SUMMARY

The objects of the disclosure are to provide an optical anti-shaking mechanism, a lens driving device, an imaging equipment and an electronic apparatus that can solve the above technical problems.

In order to achieve the above objects, the disclosure adopts the following technical solutions:

In a first aspect, the disclosure provides an optical anti-shaking mechanism including:
  a movable body, configured to install a sensor;
  a fixed body, configured to support the movable body;
  a resilient anti-shaking frame, resiliently connected to the movable body and the fixed body and configured to make the movable body overhang the fixed body; and
  a diving assembly, including an X-axis driving assembly configured to drive the movable body move along an X-axis in a horizontal plane perpendicular to an optical axis; and/or a Y-axis driving assembly configured to drive the movable body to move along a Y-axis in a horizontal plane perpendicular to an optical axis.

In an embodiment, the optical anti-shaking mechanism further includes: a focusing motor assembly, configured to support an optical component; an optical anti-shaking frame, configured to be connected to the focusing motor assembly and the movable body; and an optical anti-shaking resilient supporting assembly comprising: X-axis resilient supports and Y-axis resilient supports, the optical anti-shaking resilient supporting assembly being configured to make the focusing motor assembly overhang the movable body; the X-axis driving assembly being configured to drive the focusing motor assembly to move along an X-axis in a second horizontal plane perpendicular to the optical axis, and the Y-axis driving assembly being configured to drive the focusing motor assembly to move along a Y-axis in the second horizontal plane perpendicular to the optical axis.

In an embodiment, the resilient anti-shaking frame includes two U-shaped resilient supporting frames symmetrically distributed with the optical axis as a center, openings of the two U-shaped resilient supporting frames are opposite to each other, a middle of each of the two U-shaped resilient supporting frames is fixed on the movable body, and two ends of each of the two U-shaped resilient supporting frames are fixed on the fixed body.

In an embodiment, the two ends of each of the two U-shaped resilient supporting frames are connected to resilient connecting parts, each of the resilient connecting parts extends downward and is located on a circumferential outer side of the movable body, and a lower end of each of the resilient connecting parts is fixedly connected to the fixed body.

In an embodiment, middles of the two U-shaped resilient supporting frames are connected to a fixed frame, and the fixed frame is fixed on the movable body.

In an embodiment, there is a resilient gap between every two opposite ends of the two U-shaped resilient supporting frames, two opposite sides of the fixed frame are provided with fixed sleeve parts located inside the resilient gaps, and the fixed sleeve parts are respectively sleeved on opposite sides of the movable body.

In an embodiment, the optical anti-shaking resilient supporting assembly includes: two X-direction resilient sheets, symmetrically distributed with the optical axis of the optical component as an axis of symmetry, the two X-direction resilient sheets being configured to be connected to the focusing motor assembly and the optical anti-shaking frame, or configured to be connected to the movable body and the optical anti-shaking frame; two Y-direction resilient sheets, symmetrically distributed with the optical axis of the optical component as an axis of symmetry, the two X-direction resilient sheets being configured to be connected to the movable body and the optical anti-shaking frame, or configured to be connected to the focusing motor assembly and the optical anti-shaking frame; and
  when the two X-direction resilient sheets are connected to the focusing motor assembly and the optical anti-shaking frame, the two Y-direction resilient sheets are connected to the movable body and the optical anti-shaking frame; or when the two X-direction resilient sheets are connected to the movable body and the optical anti-shaking frame, the two Y-direction resilient sheets are connected to the focusing motor assembly and the optical anti-shaking frame.

In an embodiment, a structure of each of two X-direction resilient sheets is the same as that of each of the two Y-direction resilient sheets, the structure includes a middle-fixed part, two end-fixed parts and two connecting parts, two ends of the middle-fixed part are connected to the two connecting parts respectively, and an end of each of the two connecting parts far away from the middle-fixed part is connected to one of the two end-fixed parts.

In an embodiment, the two end-fixed parts of each of the two X-direction resilient sheets are fixed on the optical anti-shaking frame, and the middle-fixed part of each of the two X-direction resilient sheets is fixed on the focusing motor assembly; and the two end-fixed parts of each of the two Y-direction resilient sheets are fixed on the movable body, and the middle-fixed part of each of the two Y-direction resilient sheets is fixed on the optical anti-shaking frame.

In an embodiment, the two end-fixed parts of each of the two X-direction resilient sheets are fixed on the movable body, and the middle-fixed part of each of the two X-direction resilient sheets is fixed on the optical anti-shaking frame; and the two end-fixed parts of each of the two Y-direction resilient sheets are fixed on the optical anti-shaking frame, and the middle-fixed part of each of the two Y-direction resilient sheets is fixed on the focusing motor assembly.

In an embodiment, four corners of the movable body are respectively provided with first fixed parts, and two of the first fixed parts as a group; the two end-fixed parts of each of the two X-direction resilient sheets are respectively fixed on the two of the first fixed parts of the same group, or the two end-fixed parts of each of the two Y-direction resilient sheets are respectively fixed on the two of the first fixed parts of the same group.

In an embodiment, four corners of the optical anti-shaking frame are respectively provided with second fixed parts, and two of the second fixed parts as a group; the two end-fixed parts of each of the two X-direction resilient sheets are respectively fixed on the two of the second fixed parts of the same group, or the two end-fixed parts of each of the two Y-direction resilient sheets are respectively fixed on the two of the second fixed parts of the same group.

In an embodiment, middles of two opposite sides in circumferential four outer sides of an outer frame of the focusing motor assembly are respectively connected to two third fixed parts, middles of two opposite sides of the optical anti-shaking frame are respectively connected to two fourth fixed parts, and the two third fixed parts and the two fourth fixed parts are respectively distributed on four ends of a criss-cross;
  the middle-fixed parts of the two X-direction resilient sheets are respectively fixed on the two third fixed parts, and the middle-fixed parts of the two Y-direction resilient sheets are respectively fixed on the two fourth fixed parts; or
  the middle-fixed parts of the two X-direction resilient sheets are respectively fixed on the two fourth fixed parts, and the middle-fixed parts of the two Y-direction resilient sheets are respectively fixed on the two third fixed parts.

In an embodiment, the X-direction resilient sheets and the Y-direction resilient sheets are located at a lower inner side of a circumferential side of the optical anti-shaking frame, and the circumferential side of the optical anti-shaking frame is provided with avoidance grooves configured to avoid the connecting parts of the X-direction resilient sheets and the Y-direction resilient sheets, and the connecting parts are respectively located in the avoidance grooves.

In an embodiment, the X-axis driving assembly includes two X-axis driving coils fixed on the movable body, and two opposite sides of a lower end of an outer frame of the focusing motor assembly are respectively provided with X-axis driving magnets corresponding to the two X-axis driving coils one by one.

In an embodiment, the Y-axis driving assembly includes two Y-axis driving coils fixed on the movable body, and the other two opposite sides of the lower end of the outer frame of the focusing motor assembly are respectively provided with Y-axis driving magnets corresponding to the two Y-axis driving coils one by one.

In an embodiment, the optical anti-shaking frame is sleeved outside an upper end of the outer frame of the focusing motor assembly, and there is a gap between the optical anti-shaking frame and the outer frame.

In an embodiment, the movable body is a frame structure.

In a second aspect, the disclosure further provides a lens driving device, including the optical anti-shaking mechanism.

In a third aspect, the disclosure provides an imaging equipment, including the lens driving device.

In a fourth aspect, the disclosure provides an electronic apparatus, including the imaging equipment.

Compared with the related art, the disclosure has the following advantages:

translation movement of an image sensor perpendicular to the optical axis is realized, the image sensor is disposed on the movable body, and the translation movement of the image sensor on the plane perpendicular to the optical axis is realized by using the resilient anti-shaking frame and the driving assembly, so as to achieve the optical anti-shake object of the translational movement of the image sensor.

Selecting one of the X-axis translation and the Y-axis translation as an unidirectional translation, that is, through the X-Y resilient sheets suspended by the optical anti-shaking frame, the unidirectional performance is better than that of other optical anti-shaking mechanisms, which can greatly simplify the production process and reduce the cost.

The translational movement of the optical component (such as lens) perpendicular to the optical axis is realized. The optical component is disposed on the focusing motor assembly. The driving assembly drives the focusing motor assembly to realize the translational movement perpendicular to the optical axis, so as to achieve the optical anti-shake object of the translational movement of the optical component.

The X-direction resilient sheets and the Y-direction resilient sheets are suspended on the optical anti-shaking frame respectively. When the focusing motor assembly moves in the X direction, only the X-direction resilient sheets act the opposite force, and the Y-direction resilient sheets act zero, the high-precision movement in the X direction is ensured. Similarly, the Y direction can also realize high-precision movement, and the focusing motor assembly can realize high-precision movement in X-Y composite.

DESCRIPTION OF REFERENCE NUMERALS

1: movable body, 10: first fixed part configured to fix a resilient sheet, 11: fixed body, 2: optical anti-shaking frame, 20: second fixed part configured to fix a resilient sheet, 21: avoidance groove, 22: fourth fixed part, 3: focusing motor assembly, 30: outer frame, 300: magnet positioning groove, 301: outer convex part, 302: positioning groove body, 303: avoidance cut, 31: third fixed part configured to fix a resilient sheet, 4: X-direction resilient sheet, 40: middle-fixed part, 400: transverse part, 401: inverted T-shaped part, 402: inverted T-shaped resilient space, 403: T-shaped part, 404: T-shaped resilient space, 41: end-fixed part, 42: connecting part, 5: Y-direction resilient sheet, 6: X-axis driving assembly, 60: X-axis driving coil, 61: X-axis driving magnet, 7: Y-axis driving assembly, 70: Y-axis driving coil, 71: Y-axis driving magnet, 8: housing, 9: resilient anti-shaking frame, 90: U-shaped resilient supporting frame, 91: resilient connecting part, 92: fixed frame, 93: fixed sleeve part, 94: resilient gap, a: optical component, a1: optical axis.

DETAILED DESCRIPTION OF THE EMBODIMENTS

The following are specific embodiments of the disclosure and combined with the accompanying drawings to further describe the technical solutions of the disclosure, but the disclosure is not limited to these embodiments.

Taking three axes in the attached drawings as an example, one of the three axes distributed along the optical axis is a Z axis, a first direction perpendicular to the Z axis is an X axis, and a second direction perpendicular to the Z axis is a Y axis, and the X is vertically connected to Y axes in a horizontal plane.

Embodiment 1

Figure 1:
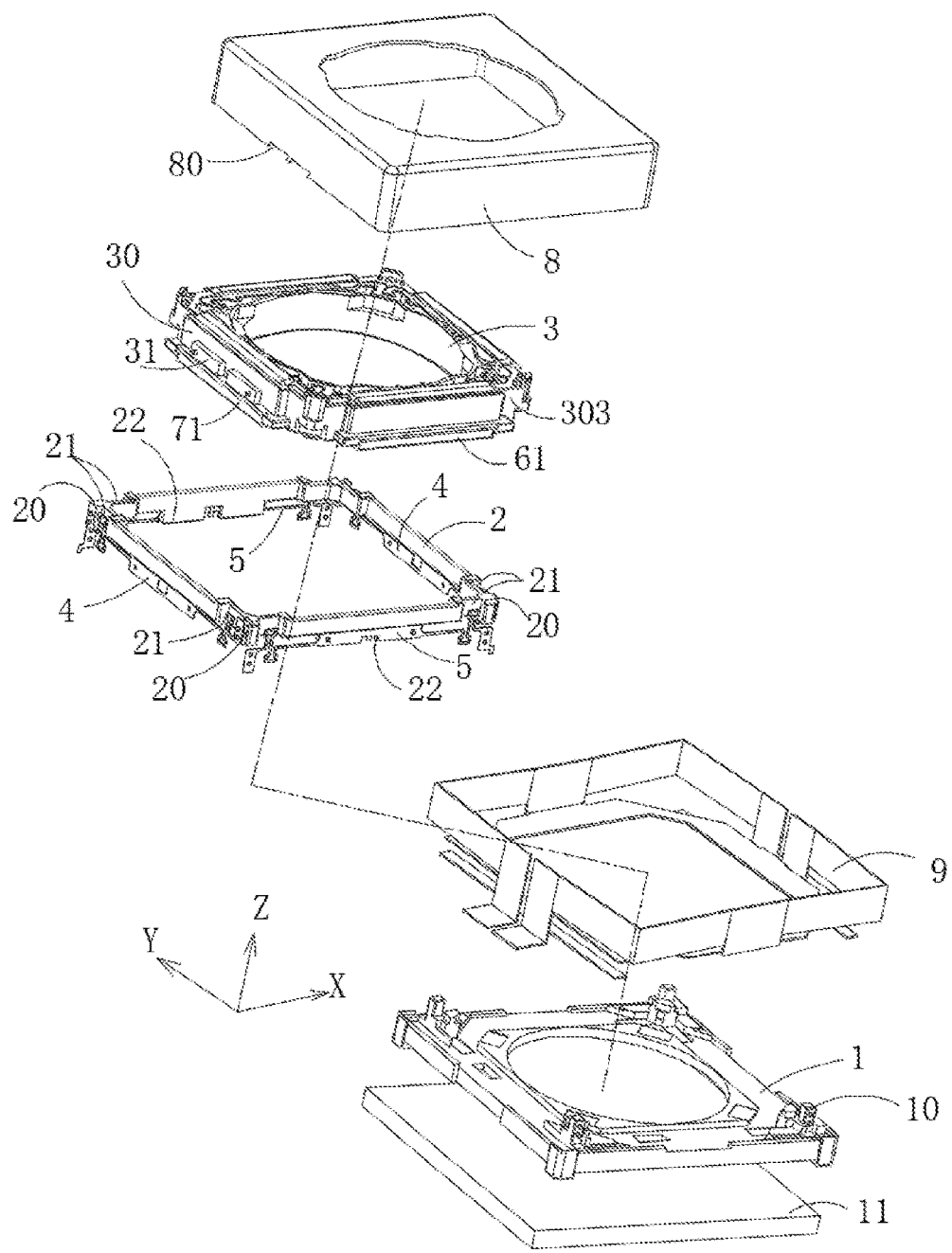
FIG. 1 is a schematic diagram of an explosion structure of an optical anti-shaking mechanism according to an embodiment 1 of the disclosure.
Figure 9:
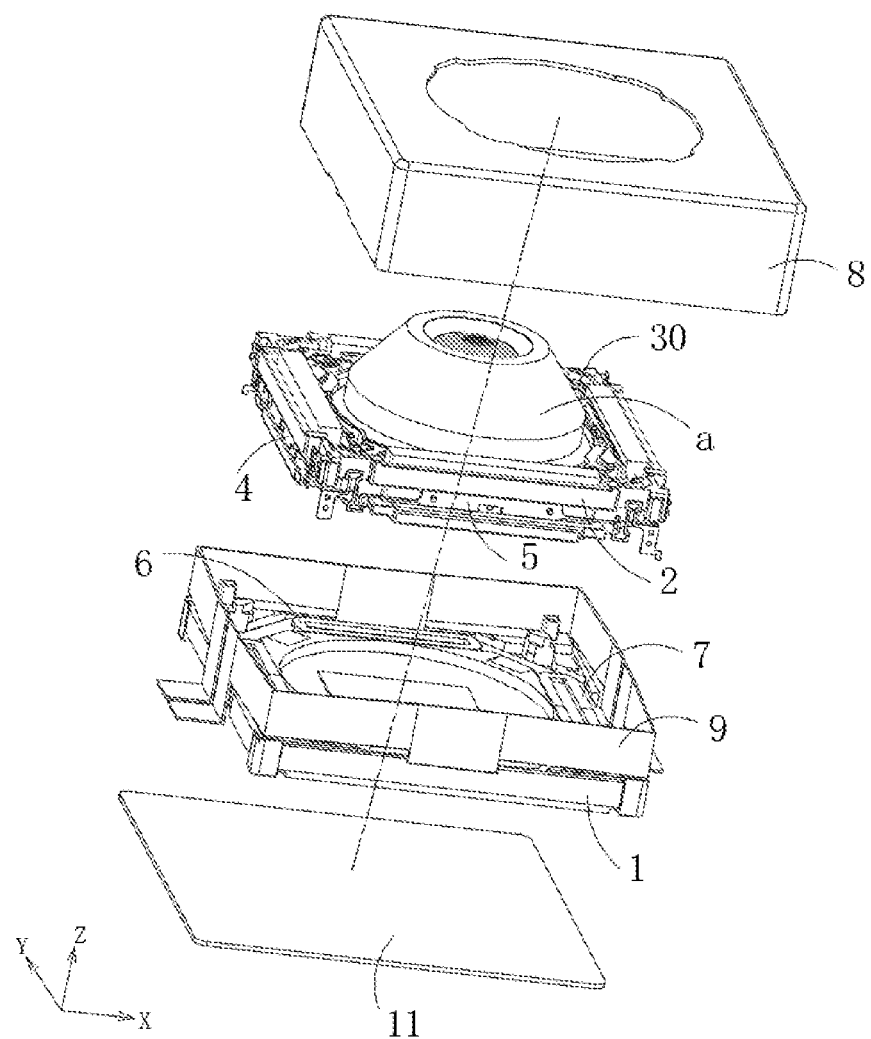
FIG. 9 is a schematic diagram of an explosion structure of the lens driving device in FIG. 7.
Figure 10:
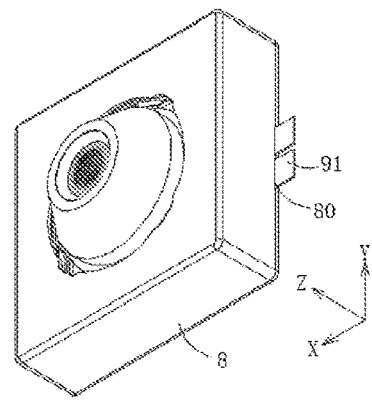
FIG. 10 is a schematic structural diagram of the lens driving device in a stereoscopic angle according to the embodiment of the disclosure.

As shown in FIG. 1 and FIGS. 9-10, an optical anti-shaking mechanism of the embodiment includes: a movable body 1, a fixed body 11, a resilient anti-shaking frame 9 and a driving assembly.

The movable body 1 is configured to install a sensor. The movable body 1 can be a frame structure. The sensor is, for example, an image sensor, etc.

The fixed body 11 is configured to support the movable body 1. The fixed body 11 can be a flat structure. The movable body 1 and the fixed body 11 are parallel.

The resilient anti-shaking frame 9 is resiliently connected to the fixed body 11 and the movable body 1. The resilient anti-shaking frame 9 is configured to make the movable body 1 overhang the fixed body 11. The resilient anti-shaking frame 9 is used to resiliently support the movable body 1 to enable the movable body 1 to perform translation movement in different directions.

Specifically, the resilient anti-shaking frame 9 can be a flexible circuit board (FPC), which further supplies power to an X-axis driving assembly 6 and a Y-axis driving assembly 7 while acting as the resilient support.

The driving assembly includes: an X-axis driving assembly 6 and/or a Y-axis driving assembly 7. The X-axis driving assembly 6 is configured to drive the movable body 1 to move (translate) along an X-axis in a horizontal plane perpendicular to an optical axis a1. The Y-axis driving assembly is configured to drive the movable body 1 to move along a Y-axis in the horizontal plane perpendicular to the optical axis a1. The resilient anti-shaking frame 9 and the driving assembly are used to realize the translation movement of the image sensor perpendicular to the optical axis, so as to achieve the optical anti-shake object of the translation movement of the image sensor.

The moving direction of the movable body 1 and the focusing motor assembly 3 is consistent.

The driving assembly of this embodiment is a driving assembly of electromagnetic driving mode.

Specifically, as shown in FIG. 1 and FIGS. 16-18, the resilient anti-shaking frame 9 includes two U-shaped resilient supporting frames 90 symmetrically distributed with the optical axis a1 as a center, openings of the two U-shaped resilient supporting frames 90 are opposite to each other, a middle of each of the two U-shaped resilient supporting frames 90 is fixed on the movable body 1, and two ends of each of the two U-shaped resilient supporting frames 90 are fixed on the fixed body 1. It ensures stable translational movement performance by using the three-point fixation method.

In an illustrated embodiment, two ends of each of the two U-shaped resilient supporting frames 90 are connected to resilient connecting parts 91, each of the resilient connecting parts 91 extends downward and is located on a circumferential outer side of the movable body 1, in this way it is possible to avoid interference hindrances that could affect the translational stability of the movable body 1. A lower end of each of the resilient connecting parts 91 is fixedly connected to the fixed body 11. The resilient connecting part 91 is L-shaped to improve the stability of fixation with the movable body 1.

In an illustrated embodiment, an external expansion angle is formed between two opposite sections of each U-shaped resilient supporting frame 90 to prevent the resilient connecting part 91 from contacting the movable body 1. At the same time, a middle section of each U-shaped resilient supporting frame 90 is arch-shaped, and an arch direction is towards the optical axis, so as to further improve the resilient performance. At the same time, avoidance grooves are disposed on a circumferential outer wall of the movable body 1 relative to the resilient connecting parts 91 to prevent mutual contact and interference, so as to improve the translation movement stability of the movable body 1.

In an illustrated embodiment, middles of the two U-shaped resilient supporting frames 90 are connected to a fixed frame 92, and the fixed frame 92 is fixed on the movable body 1 to ensure stable fixation, so as to provide a very good translational movement performance. The two U-shaped resilient supporting frames 90 are fixed together by the fixed frame 92, however there is a resilient gap 94 between every two opposite ends of the two U-shaped resilient supporting frames 90, two opposite sides of the fixed frame 92 are provided with fixed sleeve parts 93 located insides of the resilient gaps 94, the fixed sleeve parts 93 are sleeved on opposite sides of the movable body 1. The transverse section of the fixed sleeve part 93 is U-shaped, which is sleeved on the movable body 1 from the outside of the opposite sides of the movable body 1.

Driven by the driving assembly, the resilient anti-shaking frame 9 can realize the translation of the movable body 1 along the x-axis in the horizontal plane perpendicular to the optical axis a1, or the translation of the movable body 1 along the Y-axis in the horizontal plane perpendicular to the optical axis a1, so as to achieve the anti-shaking object.

As shown in FIG. 1, the optical anti-shaking mechanism further includes: a focusing motor assembly 3, an optical anti-shaking frame 2, an optical anti-shaking resilient supporting assembly.

The focusing motor assembly 3 is configured to support an optical component a.

The optical anti-shake frame 2 is configured to connect to the focusing motor assembly 3 and the movable body 1.

The optical anti-shaking resilient supporting assembly includes X-axis resilient supports and Y-axis resilient supports. The optical anti-shaking resilient supporting assembly is configured to make the focusing motor assembly 3 overhang the movable body 1.

Figure 8:
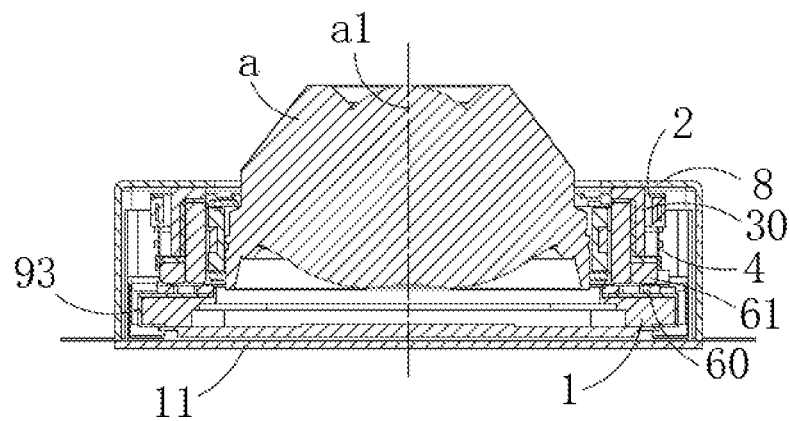
FIG. 8 is a cross-sectional structural diagram along line B-B in FIG. 7.

That is, as shown in FIG. 1 and FIG. 8, The optical anti-shaking resilient supporting assembly resiliently supports the focusing motor assembly 3 and the movable body 1, and resiliently supports the focusing motor assembly 3 and the optical anti-shaking frame 2.

Specifically, the optical anti-shaking resilient supporting assembly includes: two X-direction resilient sheets 4 and two Y-direction resilient sheets 5.

The two X-direction resilient sheets 4 is distributed opposite to each other. The two X-direction resilient sheets 4 are configured to be connected to the focusing motor assembly 3 and the optical anti-shake frame 2.

The X-direction resilient sheets 4 are vertically distributed along the optical axis a1, and the X-direction resilient sheets 4 are parallel to the optical axis a1.

The opposite distribution is at the same horizontal height to ensure symmetrical distribution with the optical axis a1 of the optical component a as an axis of symmetry.

The two Y-direction resilient sheets 5 is distributed opposite to each other, the two X-direction resilient sheets 5 are configured to be connected to the focusing motor assembly 3 and the optical anti-shaking frame 2.

The Y-direction resilient sheets 5 are vertically distributed along the optical axis a1, and the Y-direction resilient sheets 5 are parallel to the optical axis a1.

The opposite distribution is at the same horizontal height to ensure symmetrical distribution with the optical axis a1 of the optical component a as an axis of symmetry.

The two X-direction resilient sheets 4 and the two Y-direction resilient sheets 5 are distributed in a circle.

When the two X-direction resilient sheers 4 are configured to be connected to the focusing motor assembly 3 and the optical anti-shaking frame 2, the two Y-direction resilient sheets are configured to be connected to the movable body 1 and the optical anti-shaking frame 2, and the focusing motor assembly 3 is driven to move along an X-axis in the horizontal plane perpendicular to the optical axis al by the X-axis driving assembly, or the focusing motor assembly 3 is driven to move along a Y-axis in the horizontal plane perpendicular to the optical axis al by the Y-axis driving assembly.

That is, selecting one of X-axis translation and Y-axis translation are an unidirectional translation, through the X-Y resilient sheets suspended by the optical anti-shaking frame, the unidirectional performance is better than that of other optical anti-shaking mechanisms, which can greatly simplify the production process and reduce the cost.

Secondly, the translation movement of the optical component (such as lens) perpendicular to the optical axis is realized. The optical component is disposed on the focusing motor assembly, and the optical anti-shaking mechanism drives the focusing motor assembly to realize the translation movement perpendicular to the optical axis, so as to achieve the optical anti-shaking object of the translation movement of the optical component.

The X-direction resilient sheets and the Y-direction resilient sheets are suspended on the optical anti-shaking frame respectively. When the focusing motor assembly moves in the X direction, only the X-direction resilient sheets act the opposite force, and the Y-direction resilient sheets act zero, the high-precision movement in the X direction is ensured. Similarly, the Y direction can also achieve high-precision movement. The high-precision movement of the focusing motor assembly in X-Y composite is realized in this way.

The adjacent X-direction resilient sheet 4 and Y-direction resilient sheet 5 are vertically distributed.

Figure 2:
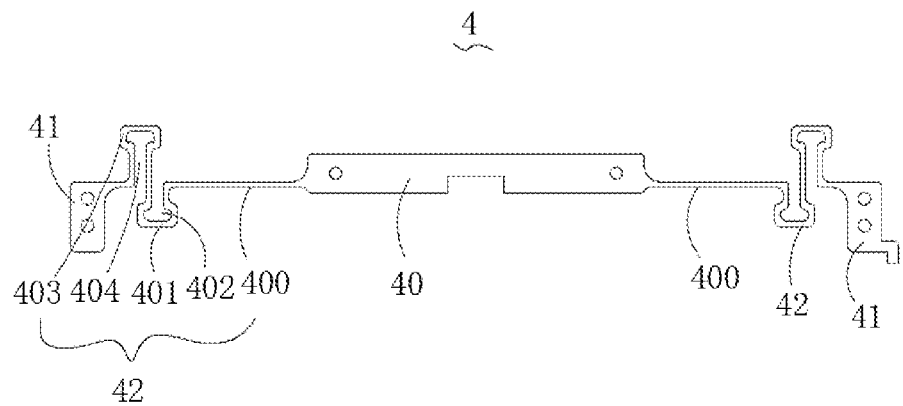
FIG. 2 is a schematic structural diagram of a X-direction resilient sheet according to the embodiment 1 of the disclosure.
Figure 3:
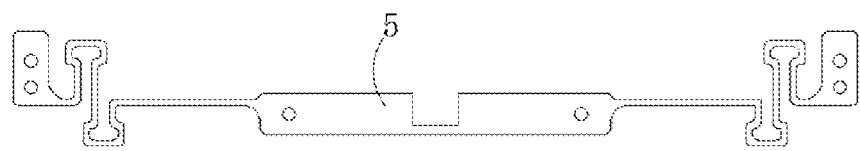
FIG. 3 is a schematic structural diagram of a Y-direction resilient sheet according to the embodiment 1 of the disclosure.

Specifically, as shown in FIGS. 1-3, a structure of each of two X-direction resilient sheets 4 is the same as that of each of the two Y-direction resilient sheets 5, the structure includes a middle-fixed part 40, two end-fixed parts 41 and two connecting parts 42, two ends of the middle-fixed part 40 are connected to the two connecting parts 42 respectively, and an end of each of the two connecting parts 42 far away from the middle-fixed part 40 is connected to one of the two end-fixed parts 41.

A width of the middle-fixed part 40 is greater than a width of the connecting part 42, and the width of the end-fixed part 41 is also greater than the width of the connecting part 42. The width of the middle-fixed part 40 tends to be equal to the width of the end-fixed part 41, or the width of the middle-fixed part 40 is greater than the width of the end-fixed part 41, so as to ensure the fixation firmness and stability of the two X-direction resilient sheets 4 and two Y-direction resilient sheets 5.

The connecting part 42 of this embodiment includes a transverse part 400 connected to the middle-fixed part 40 and an inverted T-shaped part 401 connected to an end of the transverse part 400 far away from the middle-fixed part 40. The inverted T-shaped part 401 has an inverted T-shaped resilient space 402, an opening of the inverted T-shaped resilient space 402 faces downward, and a T-shaped part 403 is connected at the end of the inverted T-shaped part 401 far away from the transverse part 400. The T-shaped part 403 has a T-shaped resilient space 404, an opening of the T-shaped resilient space 404 faces upward, the T-shaped part 403 and the inverted T-shaped resilient space 402 are staggered up and down, and an end of the T-shaped part 403 far away from the inverted T-shaped resilient space 402 is connected with the corresponding end-fixed part 41. The resilient translation and support function in the Y direction or X direction is realized by using the connecting parts, so as to realize anti-shaking function.

In an embodiment, the two end-fixed parts 41 of the X-direction resilient sheet 4 face to the T-shaped part 403, while the two end-fixed parts 41 of the Y-direction resilient sheet 5 face to the inverted T-shaped part 401 to meet the installation requirements.

In this embodiment, the two end-fixed parts 41 of each X-direction resilient sheet 4 are respectively fixed on the optical anti-shaking frame 2, and the middle-fixed part 40 of each X-direction resilient sheet 4 is fixed on the focusing motor assembly 3. The two end-fixed parts 41 of each Y-direction resilient sheet 5 are respectively fixed on the movable body 1, and the middle-fixed part 40 of each Y-direction resilient sheet 5 is fixed on the optical anti-shaking frame 2.

Using the fixed connection of the middle-fixed parts, end-fixed parts and the connecting parts at the same time, it can ensure the stability of the translation of the optical component in the X direction or Y direction. Taking the x-axis translation as an example: when the connecting parts of the two X-direction resilient sheets in the X direction are driven by the x-axis, because they are oppositely distributed, it can ensure the translation of the focusing motor assembly 3 carrying the optical component in the x-axis perpendicular to the optical axis.

Specifically, as shown in FIG. 1, four corners of the movable body 1 are respectively provided with first fixed parts 10 for fixing resilient sheets, and two of the first fixed parts as a group. The two end-fixed parts 41 of each of the two Y-direction resilient sheets are respectively fixed on the two of the first fixed parts 10 of the same group.

In an embodiment, the first fixed part 10 has a first vertical positioning surface and first transverse pins arranged on the first vertical positioning surface. The end-fixed part 41 is provided with first positioning pin holes, the end-fixed part 41 fits on the first vertical positioning surface, and the first transverse pins are inserted into the first positioning pin holes respectively.

A number of the first transverse pins and the first positioning pin holes can be matched with each other according to the actual fixed strength, such as 1-3.

In an illustrated embodiment, four corners of the optical anti-shaking frame 2 are respectively provided with second fixed parts 20 for fixing resilient sheets, and two of the second fixed parts 20 as a group. The two end-fixed parts 41 of each of the two X-direction resilient sheets 4 are respectively fixed on the two of the second fixed parts 20 of the same group.

Similarly, the structure of the second fixed part 20 is the same or similar to that of the first fixed part 10, and this embodiment will not be further described.

Figure 4:
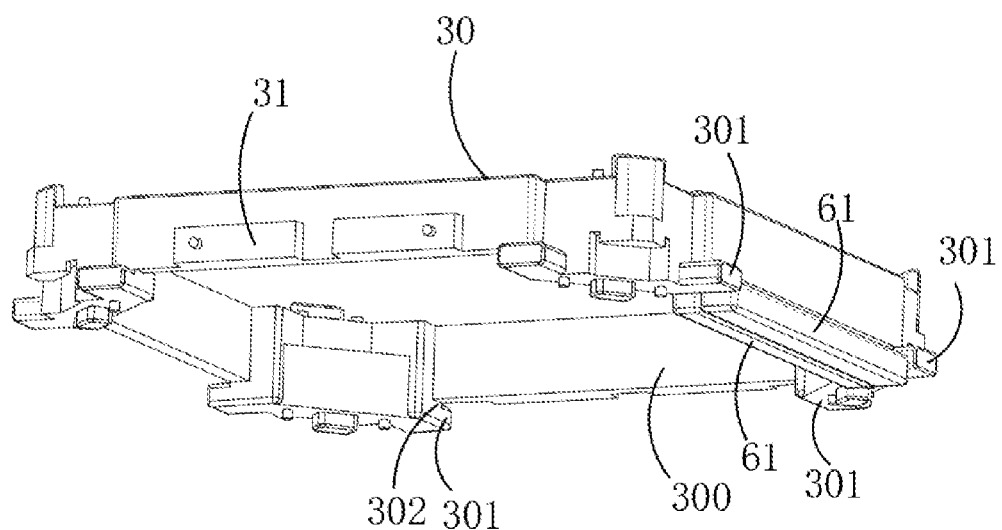
FIG. 4 is a schematic structural diagram of an outer frame according to the embodiment 1 of the disclosure.

In an illustrated embodiment, as shown in FIG. 1 and FIG. 4, middles of two opposite sides in circumferential four outer sides of an outer frame 30 of the focusing motor assembly 3 are respectively connected to two third fixed parts 31 for fixing resilient sheet, middles of two opposite sides of the optical anti-shaking frame 2 are respectively connected to two fourth fixed parts 22, and the two third fixed parts 31 and the two fourth fixed parts 22 are respectively distributed at four ends of a criss-cross (+-shape).

The middle-fixed parts 40 of the two X-direction resilient sheets 4 are respectively fixed on the two third fixed parts 31, and the middle-fixed parts 40 of the two Y-direction resilient sheets 5 are respectively fixed on the two fourth fixed parts 22.

Similarly, the structures of the third fixed part 31 and the fourth fixed part 22 are the same or similar to those of the first fixed part 10, and this embodiment will not be further described.

In an embodiment, a thickness of the fourth fixed part 22 is less than a thickness of an unilateral transverse section of the optical anti-shaking frame 2, and the outer surface of the third fixed part 31 is located on the inner side below the circumferential surface of the optical anti-shaking frame 2. The above design can facilitate the installation of the X-direction resilient sheets 4 and the Y-direction resilient sheets 5, reduce outer diameters of the optical anti-shaking frame 2 and the outer frame 30, and make the volume smaller and compact. As shown in FIGS. 8-9, because of the structure, the X-direction resilient sheets 4 and the Y-direction resilient sheets 5 can be located on the lower inner side of the circumferential side of the optical anti-shaking frame 2.

As shown in FIG. 1, the circumferential side of the optical anti-shaking frame 2 is provided with avoidance grooves 21 configured to avoid the connecting parts 42 of the X-direction resilient sheets 4 and the Y-direction resilient sheets 5, and the connecting parts 42 are respectively located in the avoidance grooves 21. The above structure can improve the compactness of the overall structure, ensure the smoothness of the translation of the optical components, and avoid the failure of the translation movement of the optical components caused by blocking interference.

In an embodiment, the third fixed part 31 is located below the lower end of the optical anti-shaking frame 2, and the fourth fixed part 22 is connected to the corresponding position of the lower end of the optical anti-shaking frame 2. The inner wall of the fourth fixed part 22 is parallel and level with the inner wall of the optical anti-shaking frame 2.

Figure 5:
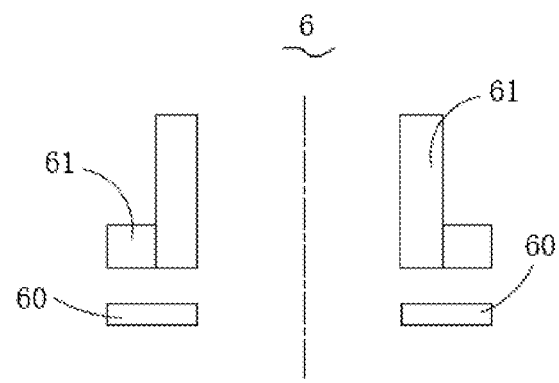
FIG. 5 is a schematic structural diagram of an X-axis driving assembly according to the embodiment 1 of the disclosure.
Figure 6:
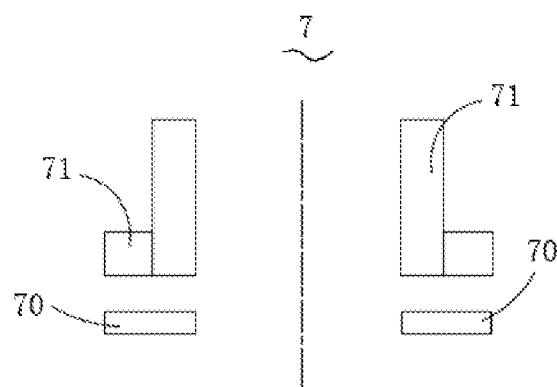
FIG. 6 is a schematic structural diagram of a Y-axis driving assembly according to the embodiment 1 of the disclosure.
Figure 7:
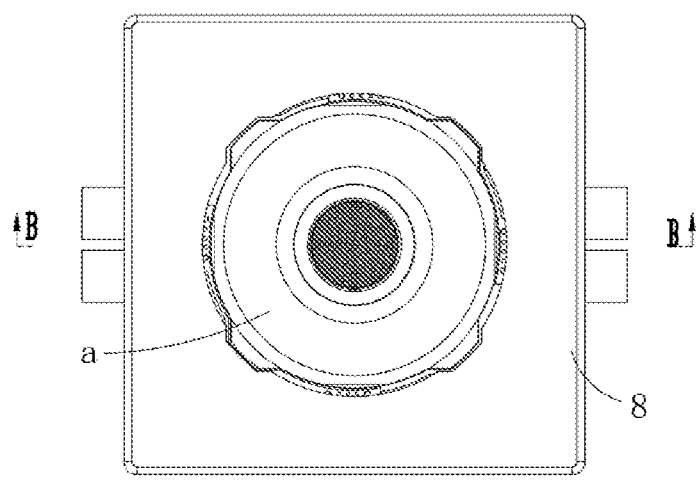
FIG. 7 is a schematic structural diagram of a lens driving device according to an embodiment of the disclosure.

In an illustrated embodiment, as shown in FIGS. 1-4 and FIG. 9, the optical anti-shaking mechanism further includes:
the focusing motor assembly 3, configured to support the optical component a;
the movable body 1, configured to support the focusing motor assembly 3;
the optical anti-shaking frame 2, configured to be connected to the focusing motor assembly 3 and the movable body 1; and
the optical anti-shaking resilient supporting assembly, the optical anti-shaking resilient supporting assembly is configured to make the focusing motor assembly 3 overhang the movable body 1.
as shown in FIG. 1 and FIGS. 5-6,
the driving assembly, including: the X-axis driving assembly 6 and the Y-axis driving assembly 7. The X-axis driving assembly 6 is configured to drive the focusing motor assembly 3 to move along an X-axis in a horizontal plane perpendicular to an optical axis a1, and the Y-axis driving assembly 7 is configured to drive the focusing motor assembly 3 to move along a Y-axis in the horizontal plane perpendicular to the optical axis a1.

Specifically, as shown in FIGS. 4-6, the X-axis driving assembly 6 includes two X-axis driving coils 60 fixed on the movable body 1. Two opposite sides of a lower end of an outer frame 30 of the focusing motor assembly 3 are respectively provided with X-axis driving magnets 61 corresponding to the two X-axis driving coils 60 one by one. The X-axis driving magnets 61 of this embodiment is a double magnet, that is, the two magnets are disposed on the same horizontal plane perpendicular to the optical axis to improve the magnetic driving force.

The X-axis driving magnet 61 is located above the corresponding X-axis driving coil 60.

The Y-axis driving assembly 7 includes two Y-axis driving coils 70 fixed on the movable body 1. The other two opposite sides of the lower end of the outer frame 30 of the focusing motor assembly 3 are respectively provided with Y-axis driving magnets 71 corresponding to the two Y-axis driving coils 70 one by one. The Y-axis driving magnet 71 of this embodiment is a double magnet, that is, the two magnets are disposed on the same horizontal plane perpendicular to the optical axis to improve the magnetic driving force.

The Y-axis driving magnet 71 is located above the corresponding Y-axis driving coil 70.

The two X-axis driving coils 60 are fixed on the two opposite surfaces of the upper surface of the fixed frame 92, and the two Y-axis driving coils 70 are fixed on the other two opposite surfaces of the upper surface of the fixed frame 92.

In an embodiment, the X-axis driving magnets 61 and the Y-axis driving magnets 71 are located on the same horizontal plane perpendicular to the optical axis. This structure is convenient for processing, design and assembly and ensures the balance of the center of gravity.

In an embodiment, as shown in FIG. 4, four wall surfaces of the inner wall of the outer frame 30 are respectively provided with magnet positioning grooves 300. For each X-axis driving magnet 61, one on the inner side of the two magnets extends into the corresponding magnet positioning groove 300. For each Y-axis driving magnet 71, one on the inner side of the two magnets extends into the corresponding magnet positioning groove 300. The two ends of each of the four outer wall surfaces of the outer wall of the outer frame 30 are respectively provided with outer convex parts 301, a magnet fixing space is formed between the two outer convex parts 301 on the same outer wall surface. Positioning groove bodies 302 are arranged on the four end surfaces at the lower end of the outer frame 30 and connected to the magnet fixing spaces. For each X-axis driving magnet 61, the other one of the two magnets is fixed in the corresponding magnet fixing space and corresponding positioning groove. For each Y-axis driving magnet 71, the other one of the two magnets is fixed in the corresponding positioning groove and the magnet fixing space, and the lower surfaces of the two Y-axis driving magnets 71 are parallel and level.

In an embodiment, as shown in FIGS. 8-9, in order to further reduce the thickness of the mechanism along the optical axis direction, the optical anti-shaking frame 2 of the disclosure is sleeved outside the upper end of the outer frame 30 of the focusing motor assembly 3, and there is a gap between the optical anti-shaking frame 2 and the outer frame 30. It avoids increasing the thickness of the optical anti-shaking frame 2 above the outer frame 30, that is, this structure of the disclosure can be applied to a smaller installation space.

In addition, a housing 8 is connected to the movable body 1, and the focusing motor assembly 3, the optical anti-shaking frame 2 and the optical anti-shaking resilient supporting mechanism are disposed in a chamber formed by the movable body 1 and the housing 8. The four corners of the outer frame 30 are respectively provided with avoidance cuts 303 for the inner protrusion opposite to the avoidance groove to avoid interference.

In an embodiment, the housing 8 is provided with clamping slots 80 for the resilient connecting parts 91 to further improve the fixing stability of the resilient connecting parts 91.

The working principle of this embodiment is as follows:

After the driving circuit is powered on, for example, the driving circuit sends a driving signal to the Y-axis driving assembly 7, that is, the synergy of the Y-axis driving coils 70 and the Y-axis driving magnets 71 causes the focusing motor assembly 3 loaded with the optical component a to translate on the Y-axis perpendicular to the optical axis.

When the X-axis driving assembly acquire the driving signal, the synergy of the X-axis driving coils 60 and the X-axis driving magnets 61 causes the focusing motor assembly 3 loaded with the optical component a to translate on the X-axis perpendicular to the optical axis.

Embodiment 2

Figure 11:
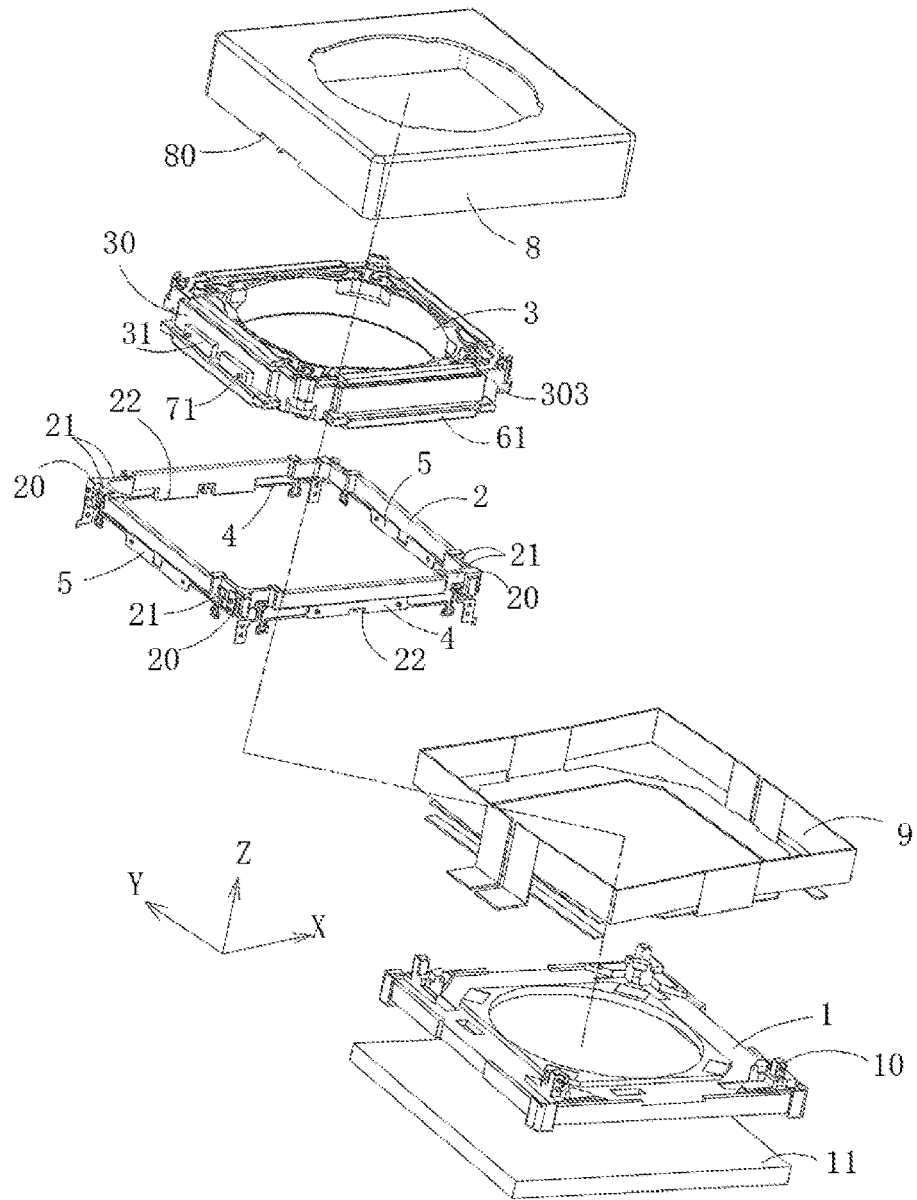
FIG. 11 is a schematic structural diagram of an optical anti-shaking mechanism according to an embodiment 2 of the disclosure.

As shown in FIG. 11, the structure and principle of this embodiment are basically the same as that of embodiment 1, except that two X-direction resilient sheets 4 are configured to be connected to the movable body 1 and the optical anti-shaking frame 2, the two Y-direction resilient sheets 5 are configured to be connected to the focusing motor assembly 3 and the optical anti-shaking frame 2. That is, when the two X-direction resilient sheets 4 are configured to be connected to the movable body 1 and the optical anti-shaking frame 2, the two Y-direction resilient sheets 5 are configured to be connected to the focusing motor assembly 3 and the optical anti-shaking frame 2.

In an embodiment, the two end-fixed parts 41 of each X-direction resilient sheet 4 are respectively fixed on the movable body 1, and the middle-fixed part 40 of each X-direction resilient sheet 4 is fixed on the optical anti-shaking frame 2. The two end-fixed parts 41 of each Y-direction resilient sheet 5 are respectively fixed on the optical anti-shaking frame 2, and the middle-fixed part 40 of each Y-direction resilient sheet 5 is fixed on the focusing motor assembly 3.

In an embodiment, the middle-fixed parts 40 of the two X-direction resilient sheets 4 are respectively fixed on the fourth fixed parts 22.

The middle-fixed parts 40 of the two Y-direction resilient sheets 5 are respectively fixed on the third fixed parts 31.

Embodiment 3

Figure 12:
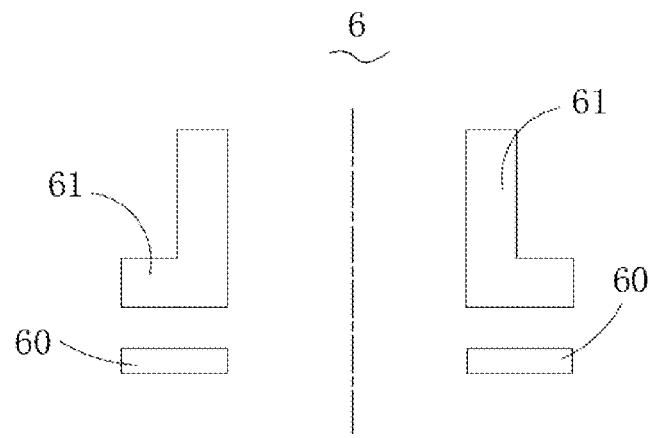
FIG. 12 is a schematic structural diagram of an X-axis driving assembly according to an embodiment 3 of the disclosure.

As shown in FIG. 12, the structure and principle of this embodiment are basically the same as that of embodiment 1, except that the X-axis driving magnet 61 is a single magnet.

Embodiment 4

Figure 13:
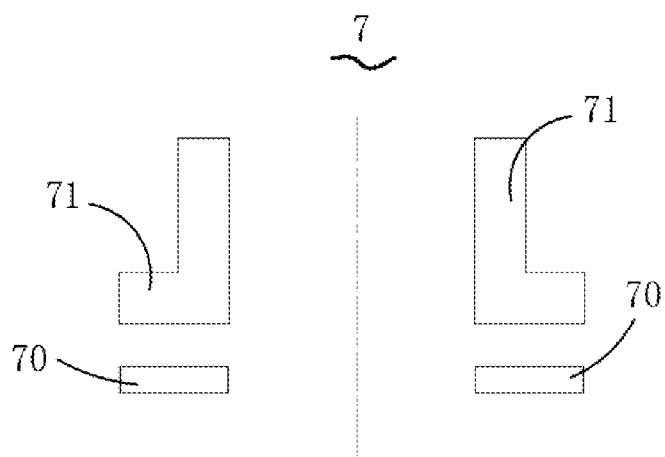
FIG. 13 is a schematic structural diagram of a Y-axis driving assembly according to an embodiment 4 of the disclosure.

As shown in FIG. 13, the structure and principle of this embodiment are basically the same as that of embodiment 1, except that the Y-axis driving magnet 71 is a single magnet.

Embodiment 5

Based on embodiments 1 to 4, as shown in FIG. 7-10, this embodiment provides a lens driving device, including the optical anti-shaking mechanism described in embodiments 1 to 4. That is, it includes the focusing motor assembly 3, which can be an AF motor, including an outer frame 30, a carrier, an upper resilient sheet and a lower resilient sheet. The upper resilient sheet and the lower resilient sheet work together to make the carrier disposed in the outer frame 30. At the same time, an anti-collision protrusion is arranged at the lower part of the outer frame 30 to prevent the focusing motor assembly 3 from hitting the translation moving body 1 downward. The optical component a, such as a lens, is installed on the AF motor.

Embodiment 6

Figure 14:
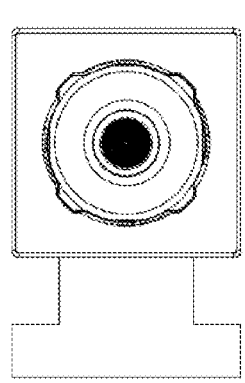
FIG. 14 is a schematic structural diagram of an imaging equipment according to an embodiment 6 of the disclosure.

Based on embodiment 5, as shown in FIG. 14, this embodiment provides an imaging equipment, including the lens driving device described in embodiment 5. The imaging equipment such as an imaging module.

Embodiment 7

Figure 15:
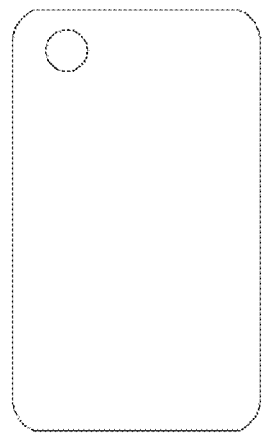
FIG. 15 is a schematic structural diagram of an electronic apparatus according to an embodiment 7 of the disclosure.
Figure 16:
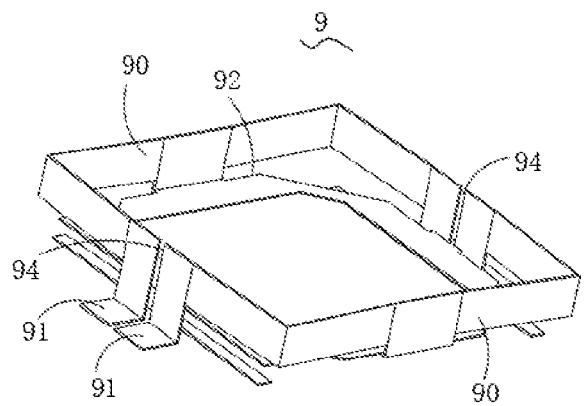
FIG. 16 is a schematic structural diagram of a resilient anti-shaking frame according to the embodiment 1 of the disclosure.
Figure 17:
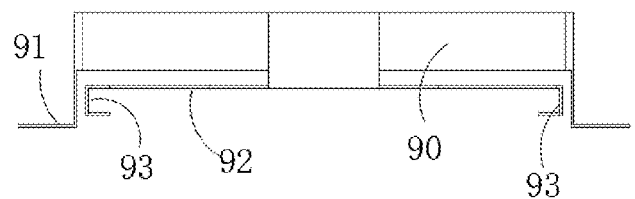
FIG. 17 is a schematic structural diagram of the resilient anti-shaking frame in a side view according to the embodiment 1 of the disclosure.
Figure 18:
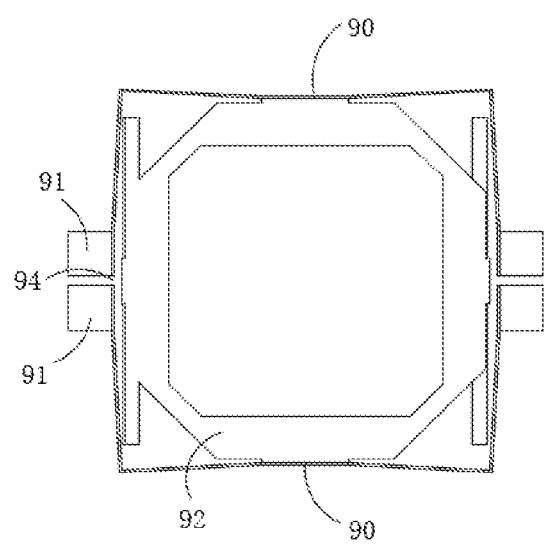
FIG. 18 is a schematic structural diagram of the resilient anti-shaking frame in a top view according to the embodiment 1 of the disclosure.

Based on embodiment 6, as shown in FIG. 15, this embodiment provides an electronic apparatus, including the imaging equipment described in embodiment 6. The electronic apparatus such as mobile phones and so on.

The specific embodiments described herein are merely illustrative of the spirit of the disclosure. Those skilled in the art of the disclosure can make various modifications or replacements to the described specific embodiments or adopt similar methods, but will not deviate from the spirit of the disclosure or go beyond the scope defined in the appended claims.

What is claimed is:

1. An optical anti-shaking mechanism, comprising:
a movable body, configured to install a sensor;
a fixed body, configured to support the movable body;
a resilient anti-shaking frame, resiliently connected to the fixed body and the movable body and configured to make the movable body overhang the fixed body;
a driving assembly, comprising:
an X-axis driving assembly, configured to drive the movable body to move along an X-axis in a horizontal plane perpendicular to an optical axis; and
a Y-axis driving assembly, configured to drive the movable body to move along a Y-axis in the horizontal plane perpendicular to the optical axis;
a focusing motor assembly, configured to support an optical component;
an optical anti-shaking frame, configured to be connected to the focusing motor assembly and the movable body; and
an optical anti-shaking resilient supporting assembly comprising: X-axis resilient supports and Y-axis resilient supports, wherein the optical anti-shaking resilient supporting assembly is configured to make the focusing motor assembly overhang the movable body.

2. The optical anti-shaking mechanism according to claim 1, wherein the resilient anti-shaking frame comprises two U-shaped resilient supporting frames symmetrically distributed with the optical axis as a center, openings of the two U-shaped resilient supporting frames are opposite to each other, a middle of each of the two U-shaped resilient supporting frames is fixed on the movable body, and two ends of each of the two U-shaped resilient supporting frames are fixed on the fixed body.

3. The optical anti-shaking mechanism according to claim 2, wherein the two ends of each of the two U-shaped resilient supporting frames are connected to resilient connecting parts, each of the resilient connecting parts extends downward and is located on a circumferential outer side of the movable body, and a lower end of each of the resilient connecting parts is fixedly connected to the fixed body.

4. The optical anti-shaking mechanism according to claim 2, wherein middles of the two U-shaped resilient supporting frames are connected to a fixed frame, and the fixed frame is fixed on the movable body.

5. The optical anti-shaking mechanism according to claim 4, wherein there is a resilient gap between every two opposite ends of the two U-shaped resilient supporting frames, two opposite sides of the fixed frame are provided with fixed sleeve parts located inside the resilient gaps, and the fixed sleeve parts are respectively sleeved on opposite sides of the movable body.

6. The optical anti-shaking mechanism according to claim 1, wherein the optical anti-shaking resilient supporting assembly comprises:
two X-direction resilient sheets, symmetrically distributed with the optical axis of the optical component as an axis of symmetry, wherein the two X-direction resilient sheets are configured to be connected to the focusing motor assembly and the optical anti-shaking frame, or configured to be connected to the movable body and the optical anti-shaking frame;
two Y-direction resilient sheets, symmetrically distributed with the optical axis of the optical component as an axis of symmetry, wherein the two X-direction resilient sheets are configured to be connected to the movable body and the optical anti-shaking frame, or configured to be connected to the focusing motor assembly and the optical anti-shaking frame; and
wherein when the two X-direction resilient sheets are connected to the focusing motor assembly and the optical anti-shaking frame, the two Y-direction resilient sheets are connected to the movable body and the optical anti-shaking frame; or when the two X-direction resilient sheets are connected to the movable body and the optical anti-shaking frame, the two Y-direction resilient sheets are connected to the focusing motor assembly and the optical anti-shaking frame.

7. The optical anti-shaking mechanism according to claim 6, wherein a structure of each of two X-direction resilient sheets is the same as that of each of the two Y-direction resilient sheets, the structure comprises a middle-fixed part, two end-fixed parts and two connecting parts, two ends of the middle-fixed part are connected to the two connecting parts respectively, and an end of each of the two connecting parts far away from the middle-fixed part is connected to one of the two end-fixed parts.

8. The optical anti-shaking mechanism according to claim 7, wherein the two end-fixed parts of each of the two X-direction resilient sheets are fixed on the optical anti-shaking frame, and the middle-fixed part of each of the two X-direction resilient sheets is fixed on the focusing motor assembly; and
wherein the two end-fixed parts of each of the two Y-direction resilient sheets are fixed on the movable body, and the middle-fixed part of each of the two Y-direction resilient sheets is fixed on the optical anti-shaking frame.

9. The optical anti-shake mechanism according to claim 7, wherein the two end-fixed parts of each of the two X-direction resilient sheets are fixed on the movable body, and the middle-fixed part of each of the two X-direction resilient sheets is fixed on the optical anti-shaking frame; and
wherein the two end-fixed parts of each of the two Y-direction resilient sheets are fixed on the optical anti-shaking frame, and the middle-fixed part of each of the two Y-direction resilient sheets is fixed on the focusing motor assembly.

10. The optical anti-shaking mechanism according to claim 7, wherein four corners of the movable body are respectively provided with first fixed parts, and two of the first fixed parts as a group;

wherein the two end-fixed parts of each of the two X-direction resilient sheets are respectively fixed on the two of the first fixed parts of the same group, or the two end-fixed parts of each of the two Y-direction resilient sheets are respectively fixed on the two of the first fixed parts of the same group.

11. The optical anti-shaking mechanism according to claim 7, wherein four corners of the optical anti-shaking frame are respectively provided with second fixed parts, and two of the second fixed parts as a group;

wherein the two end-fixed parts of each of the two X-direction resilient sheets are respectively fixed on the two of the second fixed parts of the same group, or the two end-fixed parts of each of the two Y-direction resilient sheets are respectively fixed on the two of the second fixed parts of the same group.

12. The optical anti-shaking mechanism according to claim 7, wherein middles of two opposite sides in circumferential four outer sides of an outer frame of the focusing motor assembly are respectively connected to two third fixed parts, middles of two opposite sides of the optical anti-shaking frame are respectively connected to two fourth fixed parts, and the two third fixed parts and the two fourth fixed parts are respectively distributed on four ends of a criss-cross;

wherein
the middle-fixed parts of the two X-direction resilient sheets are respectively fixed on the two third fixed parts, and the middle-fixed parts of the two Y-direction resilient sheets are respectively fixed on the two fourth fixed parts; or
the middle-fixed parts of the two X-direction resilient sheets are respectively fixed on the two fourth fixed parts, and the middle-fixed parts of the two Y-direction resilient sheets are respectively fixed on the two third fixed parts.

13. The optical anti-shaking mechanism according to claim 7, wherein the X-direction resilient sheets and the Y-direction resilient sheets are located at a lower inner side of a circumferential side of the optical anti-shaking frame, and the circumferential side of the optical anti-shaking frame is provided with avoidance grooves configured to avoid the connecting parts of the X-direction resilient sheets and the Y-direction resilient sheets, and the connecting parts are respectively located in the avoidance grooves.

14. The optical anti-shaking mechanism according to claim 1, wherein the X-axis driving assembly comprises two X-axis driving coils fixed on the movable body, and two opposite sides of a lower end of an outer frame of the focusing motor assembly are respectively provided with X-axis driving magnets corresponding to the two X-axis driving coils one by one.

15. The optical anti-shaking mechanism according to claim 14, wherein the Y-axis driving assembly comprises two Y-axis driving coils fixed on the movable body, and the other two opposite sides of the lower end of the outer frame of the focusing motor assembly are respectively provided with Y-axis driving magnets corresponding to the two Y-axis driving coils one by one.

16. The optical anti-shaking mechanism according to claim 14, wherein the optical anti-shaking frame is sleeved outside an upper end of the outer frame of the focusing motor assembly, and there is a gap between the optical anti-shaking frame and the outer frame.

17. A lens driving device, comprising the optical anti-shaking mechanism according to claim 1.

18. An imaging equipment, comprising the lens driving device according to claim 17.

19. An optical anti-shaking mechanism, comprising:
a movable body, configured to install a sensor;
a fixed body, configured to support the movable body;
a resilient anti-shaking frame, resiliently connected to the fixed body and the movable body and configured to make the movable body overhang the fixed body;
a driving assembly, comprising:
an X-axis driving assembly, configured to drive the movable body to move along an X-axis in a horizontal plane perpendicular to an optical axis; and
a Y-axis driving assembly, configured to drive the movable body to move along a Y-axis in the horizontal plane perpendicular to the optical axis;
wherein the resilient anti-shaking frame comprises two U-shaped resilient supporting frames symmetrically distributed with the optical axis as a center, openings of the two U-shaped resilient supporting frames are opposite to each other, a middle of each of the two U-shaped resilient supporting frames is fixed on the movable body, and two ends of each of the two U-shaped resilient supporting frames are fixed on the fixed body; and the two ends of each of the two U-shaped resilient supporting frames are connected to resilient connecting parts, each of the resilient connecting parts extends downward and is located on a circumferential outer side of the movable body, and a lower end of each of the resilient connecting parts is fixedly connected to the fixed body.

\* \* \* \* \*